US008332833B2

(12) United States Patent
Archambault et al.

(10) Patent No.: US 8,332,833 B2
(45) Date of Patent: Dec. 11, 2012

(54) PROCEDURE CONTROL DESCRIPTOR-BASED CODE SPECIALIZATION FOR CONTEXT SENSITIVE MEMORY DISAMBIGUATION

(75) Inventors: Roch Georges Archambault, North York (CA); Shimin Cui, Toronto (CA); Yaoqing Gao, North York (CA); Raul Esteban Silvera, Woodbridge (CA); Peng Zhao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1568 days.

(21) Appl. No.: 11/757,941

(22) Filed: Jun. 4, 2007

(65) Prior Publication Data

US 2008/0301656 A1     Dec. 4, 2008

(51) Int. Cl.
*G06F 9/45* (2006.01)
(52) U.S. Cl. .......................... 717/157
(58) Field of Classification Search .......... 717/157
See application file for complete search history.

(56) References Cited

U.S. PATENT DOCUMENTS

| | | | |
|---|---|---|---|
| 6,173,444 B1 | 1/2001 | Archambault | |
| 6,880,154 B2 * | 4/2005 | Ghosh et al. ............ | 717/151 |
| 7,873,958 B2 * | 1/2011 | Wiltamuth et al. ......... | 717/170 |
| 2004/0015918 A1 | 1/2004 | Kawahito et al. | |
| 2004/0205740 A1 | 10/2004 | Lavery et al. | |
| 2006/0026568 A1 * | 2/2006 | Wiltamuth et al. ........ | 717/122 |
| 2006/0212861 A1 * | 9/2006 | Tarditi et al. ............. | 717/146 |
| 2007/0256055 A1 * | 11/2007 | Herscu ..................... | 717/115 |
| 2009/0144712 A1 * | 6/2009 | Steensgaard et al. ...... | 717/154 |

OTHER PUBLICATIONS

Muth et al., "Code Specialization based on Value Profiles", http://citeseer.ist.psu.edu/muth00code.html, retrieved on Feb. 28, 2007, 20 pages.

Bernstein et al., "Dynamic Memory Disambiguation for Array References", Proceedings of the 27th annual international symposium on Microarchitecture, San Jose, California, 1994, pp. 105-111.

Huang et al., "Speculative Disambiguation: A Compilation Technique for Dynamic Memory Disambiguation", ACM SIGARCH Computer Architecture News, vol. 22, Issue 2, Apr. 1994, pp. 200-210.

Marlet et al., "Efficient Incremental Run-Time Specialization for Free", ACM SIGPLAN 1999 Conference on Programming Language Design and Implementation, Atlanta, Georgia, 1999, pp. 281-292.

Sastry, "Techniques for Transparent Program Specialization in Dynamic Optimizers", A dissertation submitted in partial fulfillment of the requirements for the degree of Doctor of Philosophy (Computer Sciences) at the University of Wisconsin-Madison, 2003, Cover page—p. 188.

* cited by examiner

*Primary Examiner* — John Chavis
(74) *Attorney, Agent, or Firm* — Yee & Associates, P.C.; David A. Mims, Jr.

(57) ABSTRACT

A computer implemented method for facilitating debugging of source code. The source code is scanned to identify a candidate region. A procedure control descriptor is generated, wherein the procedure control descriptor corresponds to the candidate region. The procedure control descriptor identifies, for the candidate region, a condition which, if true at runtime means that the candidate region can be specialized. Responsive to a determination during compile time that satisfaction of at least one condition will be known only at runtime, the procedure control descriptor is used to specialize the candidate region at compile time to create a first version of the candidate region for execution in a case where the condition is true and a second version of the candidate region for execution in a case where the condition is false, and further generate code to correctly select one of the first region and the second region at runtime.

30 Claims, 11 Drawing Sheets

Figure 1
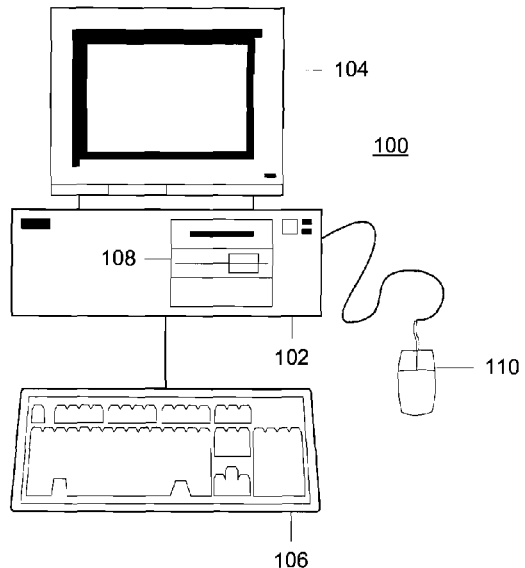
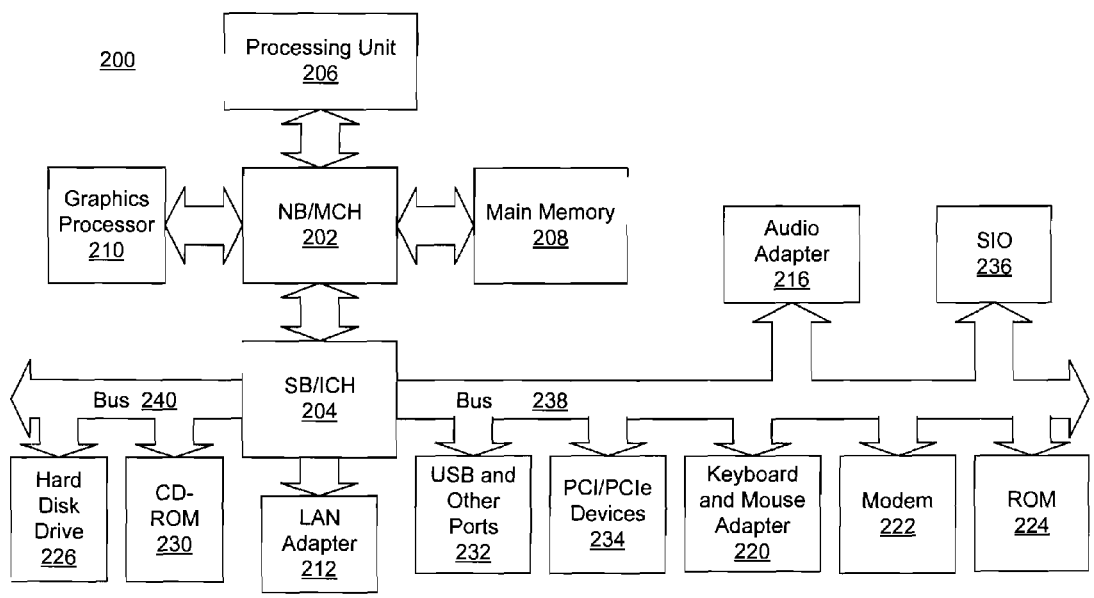
Figure 2

Figure 3
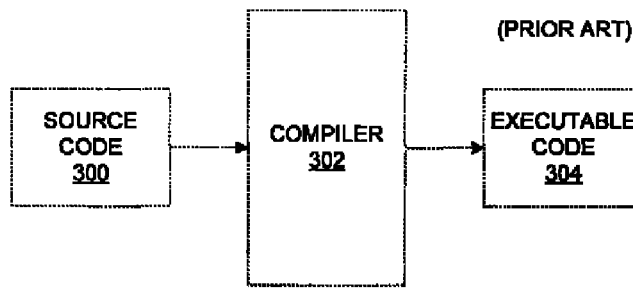
(PRIOR ART)
Figure 4
```
for (I=0; I< N; I++) {
  *p++ = *q++;
}
```
Figure 5
```
if (((p+N) < q) || ((q+N) < p)) {
  memcpy(p, q, N);
  p +=N; q += N;
} else {
  for (I=0; I< N; i++) {
    *p++ = *q++;
  }
}
```
Figure 6
```
foo (void *p,..., void *q)
{ ...//other code
  ...
  char *r = p;
  while (bytes_to_write--)
  {
      *(q->pos++) = *r++;
  }
  ...
  ... //other code
}
```
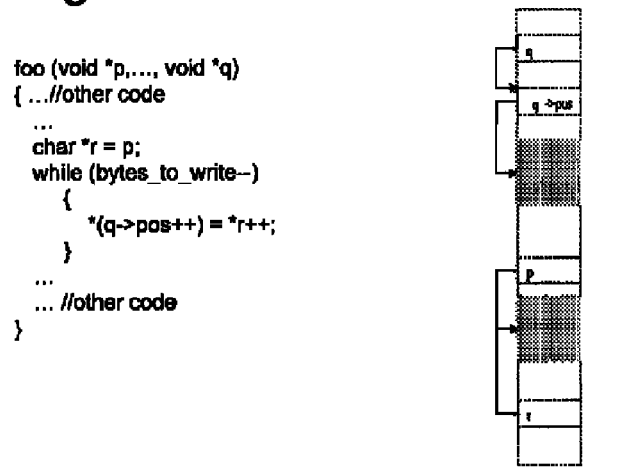

Figure 9

```
foo () {
   char *s1, *s2, *d1, *d2;
   // s1 & d1 are disjoint; s2 & d2 are disjoint too
   d1= (char*)malloc(100);
   s1= (char*)malloc(100);
   s2=d1; d2=s1;
   ......
   bar(s1, d1, s2, d2, 100);   // call-1
   ......
   // s1 & d1 are disjoint, but d2 & s2 are not disjoint
   s2 = (char*)malloc(150);
   d2 = s2 + 50;
   ......
   bar(s1, d1, s2, d2, 100);   //call -2
}
```

```
bar (char *s1, char *d1, char *s2, char *d2,
int length) {
   int i;
   // region 1, depends on d1 and s1
   for (i=0; i<length; i++) {
      d1[i] = s1[i];
   }

// region 2, depends on d2 and s2
   for (i=0; i<length; i++) {
      d2[i] = s2[i];
   }
}
```

Figure 10

```
foo () {
  char *s1, *s2, *d1, *d2;
  // s1 and d1 are disjoint; s2 and d2 are disjoint too
  d1= (char*)malloc(100);
  s1= (char*)malloc(100);
  s2=d1; d2=s1;
  ......
  bar(s1, d1, s2, d2, 100, 0x3);   // call-1
  ......
  // s1 and d1 are disjoint, but d2 and s2 are not disjoint
  s2 = (char*)malloc(100);
  d2 = s2 + 50;
  ......
  bar(s1, d1, s2, d2, 100, 0x1);   // call-2
}
```

```
bar (char *s1, char *d1, char *s2, char *d2, int length, int flag) {
  int i;
  const int control_descriptor={0x3,0xC};
  // region 1 (control descriptor: 00011)
  if (flag & 0x1) { // region 1'
    memcpy(d1, s1, length);
    i += length;
  } else {  // region 1
    for (i=0; i<length; i++) {
      d1[i] = s1[i];
    }
  }
  ......
  // region 2 (control descriptor: 01100)
  if (flag & 0x2) { // region 2'
    memcpy(d2, s2, length);
  } else {  // region 2
    for (i=0; i<length; i++) {
      d2[i] = s2[i];
    }
  }
}
```

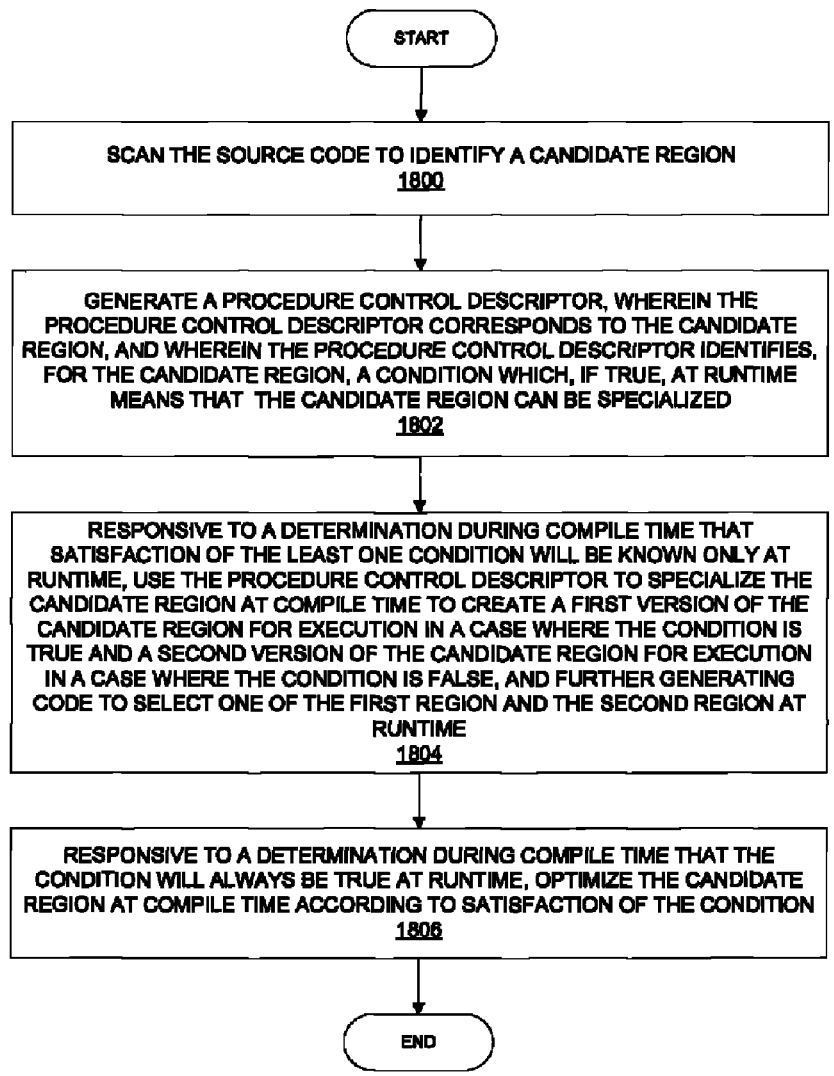

PROCEDURE CONTROL DESCRIPTOR-BASED CODE SPECIALIZATION FOR CONTEXT SENSITIVE MEMORY DISAMBIGUATION

BACKGROUND OF THE INVENTION

1. Field of the Invention

The present invention relates generally to an improved data processing system and in particular to compilers. Still more particularly, the present invention relates to a computer implemented method, apparatus, and a computer usable program product for performing code specialization during compile time.

2. Description of the Related Art

Compilers are used to transform a program written in a first language to a second language. Most often, a computer program is translated from source code written in a language that is easily read by humans into executable code written in a language that can be easily used by a computer. Computer programmers often seek ways to maximize the efficiency of executable code during the compilation process. This process is called "optimization". The word "optimization" and related terms are terms of art that refer to improvements in speed and/or efficiency of a computer program, and do not purport to indicate that a computer program has achieved, or is capable of achieving, an "optimal" or perfectly speedy or perfectly efficient state.

A problem associated with optimizing executable code concerns how the executable code performs memory access. Because the addresses of memory locations being accessed are not known until the executable program is executed, the compiler often takes a conservative approach and executes memory accesses commands in the sequential order of the source code. To prevent errors during memory access, the compiler usually places artificial dependencies between memory references to ensure that the memory references are executed in sequential order.

One form of compilation optimization related to memory access commands in the source code is known as memory disambiguation. A given set of memory access commands is considered ambiguous if the compiler cannot determine whether the memory access commands access different regions of memory. A given set of memory access commands is not considered ambiguous if the compiler can determine that the memory access commands do not access the same memory region. Memory disambiguation refers to performing analysis on code during compile time to determine whether real dependencies actually exist for a pair of ambiguous memory references.

Ambiguous memory references have traditionally been one of the main sources of performance bottlenecks in the final executable program. Static disambiguation techniques have been proposed and used when memory access patterns of the program are linear and predictable. However, these static techniques are ineffective when the memory access pattern is non-linear or when the access program cannot be determined statically.

Specializing source code with respect to runtime values is an optimization strategy that has been shown to drastically improve code performance on executable programs. Runtime is the time in which executable code is executed. Program specialization speeds up program execution by selectively executing different optimized versions of the program code, depending on the circumstances that actually exist at runtime. Code specialization can be applied to the compiler transformation in order to provide alternate paths of control to be followed based upon the results of runtime memory ambiguity checks. However, runtime memory ambiguity checks can introduce additional computing overhead, which is undesirable.

SUMMARY OF THE INVENTION

Exemplary illustrative embodiments provide for a computer implemented method, apparatus, and computer usable program code for compiling source code. In an illustrative example, the source code is scanned to identify a candidate region. A procedure control descriptor is generated, wherein the procedure control descriptor corresponds to the candidate region. The procedure control descriptor identifies, for the candidate region, a condition which, if true at runtime means that the candidate region can be specialized. The illustrative example further includes, responsive to a determination during compile time that satisfaction of at least one condition will be known only at runtime, using the procedure control descriptor to specialize the candidate region at compile time to create a first version of the candidate region for execution in a case where the condition is true and a second version of the candidate region for execution in a case where the condition is false. Code is further generated to select one of the first region and the second region at runtime.

Another illustrative example includes, responsive to a determination during compile time that the condition will always be true at runtime, optimizing the candidate region at compile time according to satisfaction of the condition. The determination that the condition will be true at runtime can be context sensitive. In another illustrative example, when a procedure is called from a first call site the condition is true, and wherein when the procedure is called from a second call site the condition is not always true.

In another illustrative example, at least one code region having a code specialization opportunity is identified. A code specialization opportunity occurs when the at least one code region contains corresponding candidate code that can be disambiguated during compile time. An alias analysis is performed to select at least one procedure, wherein the at least one procedure contains the candidate code. At least one procedure control descriptor is associated with corresponding ones of the at least one code regions. A corresponding procedure control descriptor has a corresponding flag parameter of a corresponding flag and the corresponding flag parameter identifies that a corresponding code region contains corresponding candidate code. Specialization is performed, at compile time, of selected ones of the at least one code regions having the code specialization opportunity.

In another illustrative example, identifying further includes building a corresponding call graph for each at least one procedure and traversing the call graph in reverse depth-first order. In yet another illustrative example, identifying further includes, for each node of each corresponding call graph, examining a corresponding procedure to identify the code specialization opportunity. In yet another illustrative example, identifying further includes creating at least one additional procedure control descriptor for at least one corresponding candidate code region for which at least one code specialization opportunity exists if a condition is true. For each at least one code specialization opportunity, a code specialization predicate is created for late evaluation.

In yet another illustrative example, performing alias analysis further includes performing procedural pointer analysis to create alias relationships refining aliases for all pointer variables. In yet another illustrative example, performing alias analysis further includes constructing a corresponding alias bit vector to describe the alias relationships for corresponding ones of the at least one procedure control descriptor for each corresponding call edge from corresponding ones of the at least one procedure. In yet another illustrative example, performing alias analysis further includes, for each at least one procedure, responsive to an existence of a corresponding predecessor edge from an undefined procedure and at least two alias bit vectors being different, cloning the corresponding undefined procedure, updating a corresponding call graph for each at least one code region, and aliasing the corresponding alias bit vector. In yet another illustrative example, performing alias analysis further includes for each at least one procedure, responsive to the corresponding at least one procedure being a defined procedure and at least two alias bit vectors being different, selecting the corresponding procedure as the code specialization opportunity.

In yet another illustrative example, associating further includes traversing, in reverse depth first order, a corresponding call graph for each at least one code region. In yet another illustrative example, associating further includes modifying corresponding call sites with a corresponding value of a corresponding argument of the corresponding flag parameter. In yet another illustrative example, associating further includes adding the corresponding flag parameters. In yet another illustrative example, associating further includes updating each at least one procedure control descriptor with a corresponding symbol that identifies the corresponding flag.

In yet another illustrative example, performing code specialization further includes determining, for each at least one code region, whether code specialization is needed, wherein the determination is made based on an availability of a corresponding procedure control descriptor for the corresponding at least one procedure. In yet another illustrative example, performing code specialization further includes versioning the at least one code region using a corresponding symbol that corresponds with each at least one procedure control descriptor, wherein the corresponding symbol identifies the corresponding flag. In yet another illustrative example, performing code specialization further includes computer usable program code for creating second corresponding symbols, wherein the second corresponding symbols contain additional aliasing information; and computer usable program code for replacing the corresponding symbols with the second corresponding symbols.

Another illustrative embodiment for specializing code includes gathering intra-procedural information during a forward pass compilation of the code;
    traversing a call graph of the code in reverse depth-first order;
    for each procedure of code, creating a corresponding procedure control descriptor for the corresponding candidate procedure, wherein at least one candidate procedure is a part of at least one code region;
    performing an intra-procedural alias analysis for all pointer variables referenced in the corresponding candidate procedure;
    collecting alias relationships for each at least one candidate procedure;
    analyzing the alias relationships for arguments of pointer types, wherein analyzing is performed at the end of the forward pass compilation when all nodes in the call graph have been traversed;
    refining corresponding aliases for all pointer variables for the code;
    computing the alias relationships for arguments of pointer type at all call sites for all procedures, wherein, for each procedure, all predecessor edges of a corresponding procedure node are traversed;
    constructing a corresponding bit vector to describe the alias relationships for each corresponding call edge of the call graph, if the corresponding call edge is from a defined procedure;
    examining sets of formal parameters in the corresponding procedure control descriptor;
    for each set of formal parameters in the corresponding procedure control descriptor, computing the alias relationships for the arguments, and recording a corresponding bit value in the corresponding bit vector;
    responsive to all the arguments in a given set being determined as not aliasing each other, recording a first bit value for the given set, otherwise, recording a second bit value in the given set;
    responsive to the corresponding bit vectors for at least two of the predecessor edges from the defined procedures being different, and responsive to an existence of a predecessor edge from an undefined procedure, cloning each corresponding procedure to form a corresponding cloned procedure;
    replacing a corresponding call site by calling the corresponding cloned procedure, copying the corresponding procedure control descriptor from the corresponding cloned procedure, and updating the call graph by moving all call edges from the defined procedure as predecessors of the corresponding cloned procedure;
    responsive to alias bit vectors for at least two predecessor edges from the defined procedure being different, and responsive to at least two predecessor edges of the corresponding procedure all being from defined procedures, selecting a corresponding procedure as a candidate procedure for interface change and code versioning;
    modifying the code during a backward pass by traversing the call graph in a depth-first order and, for each defined procedure, modifying all the call sites with new interfaces using a procedure interface descriptor;
    modifying a corresponding call interface for the at least one candidate procedure by, responsive to the at least one candidate procedure being a candidate for interface change and code versioning, creating a new formal parameter;
    creating an extra formal parameter for at least one candidate procedure, wherein a corresponding symbol identifying the new formal parameter is created;
    building a corresponding procedure interface descriptor for the at least one candidate procedure;
    recording an interface change in the corresponding procedure interface descriptor, wherein a corresponding entry in the corresponding procedure interface descriptor is added for the new formal parameter, wherein the corresponding entry contains the corresponding symbol and a type of the formal parameter;
    modifying the corresponding call interface with the new formal parameter;
    updating the corresponding procedure control descriptor with the corresponding symbol;
    for each set of formal parameters in the corresponding procedure control descriptor, responsive to alias bit vectors for at least two predecessor edges from the defined procedure being different, updating an attribute field with the corresponding symbol of the new formal parameter;

for each set of formal parameters in the corresponding procedure control descriptor, responsive to all alias bit vectors of the defined procedure being the same, indicating uniform alias relationships for the set of the formal parameters and propagating the uniform alias relationships to the at least one candidate procedure;

versioning the at least one code region using a corresponding procedure control descriptor condition based on the corresponding procedure control descriptor;

creating, for each corresponding procedure control descriptor condition, at least one new corresponding symbol having more precise aliasing information; and replacing the corresponding symbols with the at least one new corresponding symbol.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system, in which illustrative embodiments may be implemented;

FIG. 2 is a block diagram of a data processing system, in which illustrative embodiments may be implemented;

FIG. 3 is a block diagram of a prior art process for compiling source code;

FIG. 4 is exemplary pseudo code demonstrating a memory ambiguity;

FIG. 5 shows exemplary pseudo code as shown in FIG. 4, but modified to show code specialization with runtime ambiguity checks;

FIG. 6 shows exemplary pseudo code containing memory ambiguities;

FIG. 9 shows pseudo code, in which procedure "foo" calls procedure "bar" twice;

FIG. 10 shows pseudo code, in which procedure control descriptor based specialization is performed on the callee "bar," in accordance with an illustrative embodiment;

FIG. 18 is a flowchart illustrating a method of procedure control descriptor-based code specialization for context sensitive memory disambiguation, in accordance with an illustrative embodiment; and FIG. 19 shows pseudo code for specializing a memory region in accordance with an illustrative embodiment.

DETAILED DESCRIPTION OF THE PREFERRED EMBODIMENT

Figure 7:
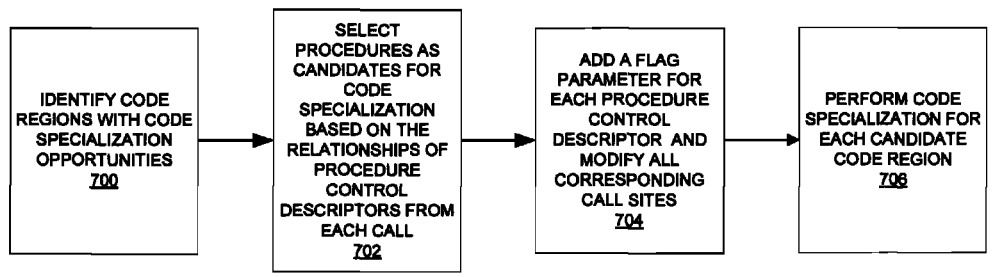
FIG. 7 is a block diagram illustrating a process taken by a compiler for procedure control descriptor based code specialization for context sensitive memory disambiguation, in accordance with an illustrative embodiment.

With reference now to the figures, and in particular with reference to FIG. 1, a pictorial representation of a data processing system is shown, in which an illustrative embodiment may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® Server™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Next, FIG. 2 depicts a block diagram of a data processing system, in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The data processing system described in FIG. 1 and FIG. 2 can be used to compile code using the illustrative examples described herein. In particular, the compilation methods of the illustrative embodiments allow code that contains some ambiguous memory allocations to be specialized with respect to unambiguous runtime values without requiring a full runtime memory ambiguity check. In an illustrative example, a general compiler method is shown for combining static analysis and runtime checking through procedure control descriptor-based code specialization for context sensitive memory disambiguation.

The following terms have the following meanings, as used herein. These definitions apply to corresponding claim terms.

A "procedure," also known as a function, is one or more lines of code that correspond to a particular process to be performed upon execution of the code.

The term "disambiguated" means that ambiguous memory allocation commands in the source code are resolved. Ambiguous commands in the source code are resolved when the ambiguity is resolved.

The term "ambiguous memory allocation command" means that a command in source code contains a memory allocation command or request that possibly may not be resolvable until runtime.

The term "undefined procedure" means that if the intermediate representation for a particular procedure is not available, then the procedure is undefined. In an illustrative example, an undefined procedure would be a similar code name linked to compile code.

The term "defined procedure" means a procedure that is not an undefined procedure.

The term "formal parameter" refers to a dummy variable associated with a procedure definition. As part of a procedure definition, the formal parameter is declared with type and name. The formal parameter provides storage space for the value of the actual argument which appears as part of the procedure call.

A "code specialization opportunity" is a condition in which at least one code region within the code contains a candidate procedure that can be disambiguated during compile time.

The term "actual argument" refers to the actual value or reference assigned to a formal parameter variable when a procedure is called.

A "procedure interface descriptor" is a set of formal parameters. The data structure of a procedure interface descriptor is used to keep track of formal parameters for procedures. Each procedure has one descriptor. The descriptor may contain entries for retaining formal parameters, dead parameters to be removed, or new parameters to be added for various optimizations of the source code.

The term "procedure control descriptor" is a list of region procedure control descriptors. Each procedure has a procedure control descriptor.

The term "region procedure control descriptor" refers to a data structure that contains context dependent information, such as formal parameters of pointer type for memory disambiguation. Each candidate code region has a record in its owner's procedure control descriptor.

A "call graph" represents the calling relationship of the procedures in a computer program. Stated differently, a call graph represents a calling relationship among subroutines in a computer program. Specifically, a call graph is a directed multi-graph, which includes a set of nodes for each procedure and edges for each procedure call. Each edge is directed starting from a caller node and ending at a callee node.

A "mask" is some data that is used along with an operation to extract information stored elsewhere. A 1 bit in a mask is used to control the corresponding bit found in the data.

"Alias analysis" is a technique in compiler theory, used to determine if a storage location may be accessed in more than one manner. Two pointers are said to be aliased if the two pointers point to the same memory location.

"Pointer analysis" is a static code analysis technique that establishes which pointers, or heap references, can point to which variables or storage locations.

An "alias bit vector" for a procedure call describes the alias relationships for each call edge if the call edge is from a defined procedure.

The term "specialized" means that source code has been modified to improve runtime performance.

In an illustrative embodiment, a procedure control descriptor is introduced for each code region with a specific code specialization opportunity in a procedure to recode the context dependent information. During global analysis at different compilation passes, some information can be evaluated and resolved at different control paths. If the information on memory disambiguation can be evaluated partially on some control flow paths, then a procedure control descriptor is created and passed to the callee. The procedure control descriptor is used as a base to compute the control relationships for the interested actual pointer-type arguments. The procedure control descriptor reduces the runtime check overhead in the final executable code. Note that the illustrative embodiments can be applied to code specialization cases other than memory disambiguation.

In another illustrative embodiment, the source code is scanned to identify a candidate region. A procedure control descriptor is generated, wherein the procedure control descriptor corresponds to the candidate region. The procedure control descriptor identifies, for the candidate region, a condition which, if true at runtime, means that the candidate region can be specialized. Responsive to a determination during compile time that satisfaction of at least one condition will be known only at runtime, the candidate region is specialized at compile time to create a first version of the candidate region for execution in a case where the condition is true and a second version of the candidate region for execution in a case where the condition is false. Also responsive to the determination, code is further generated to correctly select one of the first region and the second region at runtime.

FIG. 3 is a block diagram of a prior art process for compiling source code. The compilation process shown in FIG. 3 can be implemented in a data processing system, such as data processing system 100 shown in FIG. 1 or data processing system 200 shown in FIG. 2.

In general, a compilation process transforms source code 300 using compiler 302 to form executable code 304. Thus, compiler 302 is a computer program that translates source code 300 into executable code 304. Source code 300 is a computer program written in a language readable by a human and executable code 304 is a program written in a language more easily readable by a computer or data processing system.

More generally, a compiler is a computer program that translates text written in a first computer language into a second computer language. Compilers come in many different types, such as single pass compilers, multi-pass compilers, decompilers, and translators. In the illustrative examples provided herein, a multi-pass compiler is used. A single pass compiler performs compilation by beginning translation at the beginning of source code 300 and continuing translation until the entirety of source code 300 is translated into executable code 304. In a multi-pass compiler, source code 300 may be passed over more than once by compiler 302 during the compilation process. For example, source code 300 can be compiled in a forward direction from the beginning to the end, and then in a backward direction from the end to the beginning.

The illustrative embodiments described herein relate to performing code specialization on source code 300 during compilation by compiler 302. The problem solved by the illustrative embodiments described herein is described in relation to FIGS. 4-6. The pseudo code shown in FIGS. 4-6 is representative of code that could be implemented in a data processing system, such as data processing system 100 shown in FIG. 1 and data processing system 200 shown in FIG. 2.

FIG. 4 is exemplary pseudo code demonstrating a memory ambiguity. Variables p and q are both pointers of 1 byte type. Variable N is the loop iteration counter of an integer type. Variable i is the loop induction variable of an integer type. The pointers p and q may point to overlapping regions of memory at runtime causing memory ambiguity, especially when the memory region from address p to (p+N) overlaps the memory region from address q to (q+N).

FIG. 5 shows exemplary pseudo code as shown in FIG. 4, modified to show code specialization with runtime ambiguity checks. The loop in FIG. 4 is legally transformed into a memcpy( ) call only if there is no memory overlapping for the storage pointed by p and q.

FIG. 5 shows code specialization with runtime memory ambiguity check. The memory ambiguity check (((p+N)<q) ||((q+N)<p)) is true if there is no overlapping between the memory region from address p to (p+N) and the memory region from address q to (q+N). Otherwise, the memory ambiguity check defined in the previous sentence is false. When the memory ambiguity check is true, the loop can be transformed into a call to the memcpy( ) call which could have a highly-optimized implementation to improve the performance.

FIG. 6 shows exemplary pseudo code containing memory ambiguities. The runtime memory ambiguity check for this example could be quite complicated, which results in extra runtime overhead. Three pointers are referenced in the "while" loop, q, r, and q→pos. The memory ambiguity check needs to make sure no memory overlapping occurs among the memory region pointed-to by these three pointers at runtime.

Note that the pointer q is not changed in the loop. The check includes comparing the three memory regions, the memory region pointed-to by q, the memory region from r to (r+bytes_to_write), and the memory region from q→pos to (q→pos+bytes_to_write), as shown in the right hand portion of FIG. 6. These complex comparisons will introduce more memory region comparisons of "if" condition branches, resulting in extra runtime overhead. If the compiler can determine for at least one of the call paths that the storage pointed-to by r is disjointed with that pointed-to by q→pos, the resulting extra runtime overhead due to the check can be reduced significantly with the procedure control descriptor based code specification for context sensitive memory disambiguation. The term "disjointed" means that the memory area pointed-to by a memory access command or a procedure is different than the memory area to which another memory access command or different procedure points.

FIG. 7 is a block diagram illustrating a process taken by a compiler for procedure control descriptor based code specialization for context sensitive memory disambiguation, in accordance with an illustrative embodiment. The compilation method shown in FIG. 7 can be implemented in a data processing system, such as data processing system 100 shown in FIG. 1 or data processing system 200 shown in FIG. 2. The process shown in FIG. 7 can be implemented in a compiler, such as compiler 302 shown in FIG. 3.

The compilation shown in FIG. 7 begins with identifying code regions with code specialization opportunities in stage 700. A code specialization opportunity is a condition in which at least one code region within the code contains a candidate procedure that can be disambiguated during compile time. A procedure is one or more lines of code that correspond to a particular process to be performed upon execution of the code. The term disambiguated means that ambiguous memory allocation commands in the source code are resolved. Ambiguous commands in the source code are resolved when the ambiguity is resolved. Stage 700 can be performed, in one illustrative embodiment, through intra-procedural compiler static analysis. For each candidate code region, a procedure control descriptor is created to evaluate expressions and conditions that could result in code specialization. "Alias analysis" is a technique in compiler theory, used to determine if a storage location may be accessed in more than one manner. Two pointers are said to be aliased if the two pointers point to the same memory location.

During stage 702, the compiler performs a multiple pass static analysis to evaluate and validate conditions incrementally. The compiler also selects procedures as candidates for code specialization based on the relationships of procedure control descriptors from each call.

During stage 704, the compiler adds a flag parameter for each procedure control descriptor and modifies all corresponding call sites by passing alias information through the extra flag. During stage 706, code specialization is performed for each candidate code region that has been identified in stage 702. During stage 706, code specialization is performed.

Figure 8:
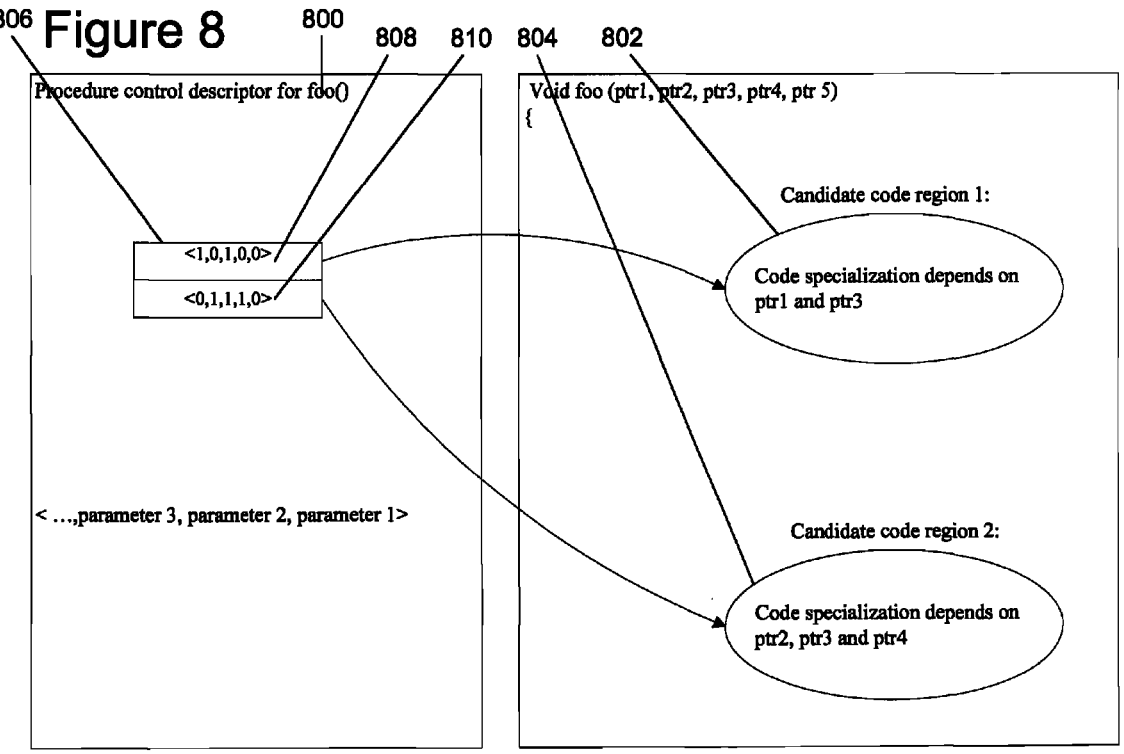
FIG. 8 shows an exemplary procedure containing candidate code regions for code specialization, in accordance with an illustrative embodiment.

FIG. 8 shows an exemplary procedure containing candidate code regions for code specialization, in accordance with an illustrative embodiment. The illustrative procedure described with respect to FIG. 7 is implemented on a sample procedure shown in FIG. 8. The exemplary process described with respect to the procedure shown in FIG. 8 can be implemented in data processing system 100 as shown in FIG. 1 or data processing system 200 as shown in FIG. 2. The illustrative example shown in FIG. 8 can be performed by a compiler, such as compiler 302 shown in FIG. 3.

In the example shown in FIG. 8, a procedure "foo" 800 contains two candidate code regions for code specialization. These include first candidate code region 802 and second candidate code region 804. First candidate code region 802 depends on arguments ptr1 and ptr3. Candidate code region 804 depends on arguments ptr2, ptr3, and ptr4.

During the first stage, which corresponds to stage 700 in FIG. 7, procedure control descriptor 806 is created with two entries, including entry 808 and entry 810 corresponding to first candidate code region 802 and second candidate code region 804, respectively. The first stage can be implemented during a forward pass compilation. The bit vector <1,0,1,0,0> is recorded in entry 808 to indicate that first candidate code region 802 can be specialized if the memory locations pointed-to by ptr1 and ptr3 are disjointed. Because ptr1 and ptr3 are disjointed, ptr1 and ptr3 point to different memory locations. The bit vector <0,1,1,1,0> is recorded in entry 810 to indicate that second candidate code region 804 can be specialized if the memory pointed-to by ptr2, ptr3, ptr4 are disjointed. As can be seen, the elements of vectors <1,0,1,0,0> and <0,1,1,1,0> correspond to the pointers (ptr1, ptr2, ptr3, ptr4, ptr5) received as arguments by the function foo 800, with a "1" representing a pointer on which there is a dependency, and a "0" representing a pointer on which there is no dependency.

During the second stage, which corresponds to stage 702 in FIG. 7, global information through control flow sensitive and insensitive pointer analysis is gathered. Pointer analysis is a static code analysis technique that establishes which pointers, or heap references, can point to which variables or storage locations. Three cases can arise when performing pointer analysis. In the first case, for all possible call edges, memory references can be disambiguated. In a second case, for all possible call edges, memory references cannot be disambiguated. In a third case, for some call edges, memory references can be disambiguated and for other call edges, memory references cannot be disambiguated.

For the first case, in which for all possible call edges, memory references can be disambiguated, every code region can be specialized without code versioning. Thus, the first case represents a trivial case where all memory references can be disambiguated during compile time. For the second case, in which for all possible call edges memory references cannot be disambiguated, runtime checking code is needed for code versioning. Thus, the second case also represents a trivial case in which all memory allocation checking must take place during runtime.

For the third case, in an illustrative example, a mask is generated for each candidate code region and an extra flag parameter is created for the corresponding procedure. In the example shown in FIG. 8, the mask will be 0x01 and 0x02 respectively, if code region one and two belong to the third case. Procedure foo(ptr1, ptr2, ptr3, ptr4, and ptr5) will be changed to procedure foo (ptr1, ptr2, ptr3, ptr4, ptr5, FLAG). For each call site, the call will be changed into a number of different procedures depending on memory references that can be disambiguated. For example, a call site can be changed to foo (ptr1, ptr2, ptr3, ptr4, ptr5, 0x0) if memory references cannot be disambiguated. In another illustrative example, a call can be changed to foo(ptr1, ptr2, ptr3, ptr4, ptr5, 0X01) if memory pointed by ptr1 and ptr3 can be disambiguated. In another illustrative example, for a call site, a call can be changed into foo (ptr1, ptr2, ptr3, ptr4, ptr5, 0X02) if memory allocations parted by ptr2, ptr3, and ptr4 can be disambiguated. In another illustrative example, for a particular call site, a call can be changed into foo (ptr1, ptr2, ptr3, ptr4, ptr5, 0X03) if memory printed by ptr1 and ptr3 can be disambiguated and memory pointed by ptr2, ptr3, and ptr4 can also be disambiguated.

After the transformations described above, the code region procedure control descriptor, such as for example procedure control descriptor 806 in FIG. 8, is updated with the symbol index for the new symbol of the extra flag parameter.

During the third stage, which corresponds to stage 704 in FIG. 7, a flag parameter is added for each procedure control descriptor of the corresponding candidate procedure. Additionally, all corresponding call sites are modified by passing the extra parameter.

During the fourth stage, which corresponds to stage 706 in FIG. 7, code specialization is performed for each candidate code region. In the example shown in FIG. 8, first candidate code region 802 and second candidate code region 804 are both candidate code regions. An example of a code specialization procedure is shown in the pseudo code in FIG. 9. Similar code can be used for first candidate code region 802 in FIG. 8, and, code similar to that shown in FIG. 9 can be modified to reference second candidate code region 804, as opposed to first candidate code region 802.

FIG. 9 is pseudo code in which procedure "foo"" calls procedure "bar" twice, in accordance with an illustrative embodiment. Procedure "bar" copies the content of the char array s1 and s2 to char array d1 and d2, respectively. Moreover, s1, s2, d1, and d2 are of the same length. In procedure "bar," whether or not the sources (s1 and s2) overlap with the destinations cannot be determined. In particular, whether or not the sources overlap depends on the calling context. A determination can be made, at the fist call site, that the sources do not overlap the destinations. However, s2 overlaps with d2 at the second call site.

FIG. 10 shows pseudo code in which procedure control descriptor based specialization is performed on the callee "bar," in accordance with an illustrative embodiment. The compiler inserts a runtime check for each region to examine whether the source overlaps with the destination. If region 1 and region 2 do not overlap, the memcpy( ) call, which is assumed to be faster and only works on non-overlapping source and destination, can be used instead of the original code. Otherwise, the original code is be used.

The two call sites pass an extra flag, which provides calling context information regarding the overlapping relationships for the two pairs of sources and destinations. In this example, 2 bits are used, one bit for each pair. Therefore, the first call site passes 3, meaning there is no overlapping for both pairs. The $2^{nd}$ call site passes 1, meaning only the first pair does not overlap.

Figure 11:
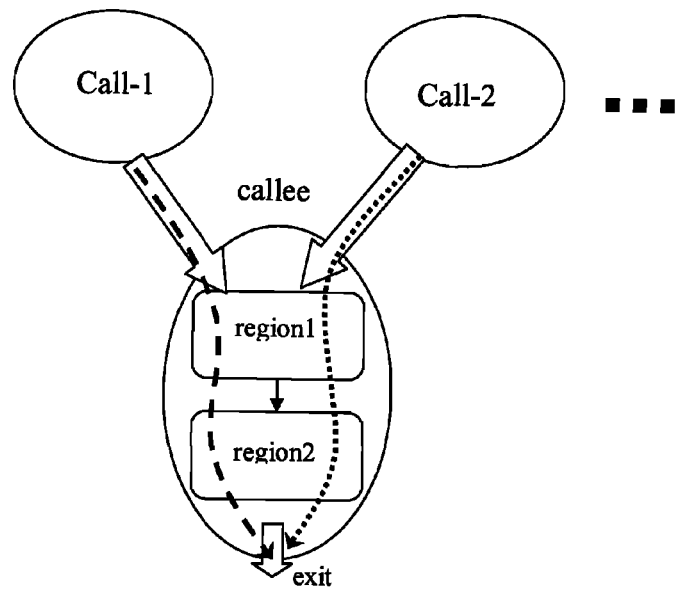
FIG. 11 is a block diagram showing two exemplary call contexts, in which the callee is called at two call sites and there are two regions in the callee, in accordance with an illustrative embodiment.

FIG. 11 shows two exemplary call contexts in which the callee is called at two call sites and there are two regions in the callee, in accordance with an illustrative embodiment. FIG. 11 is a corresponding pictorial depiction of the calling contexts, as shown in the pseudo code of FIG. 9.

Figure 12:
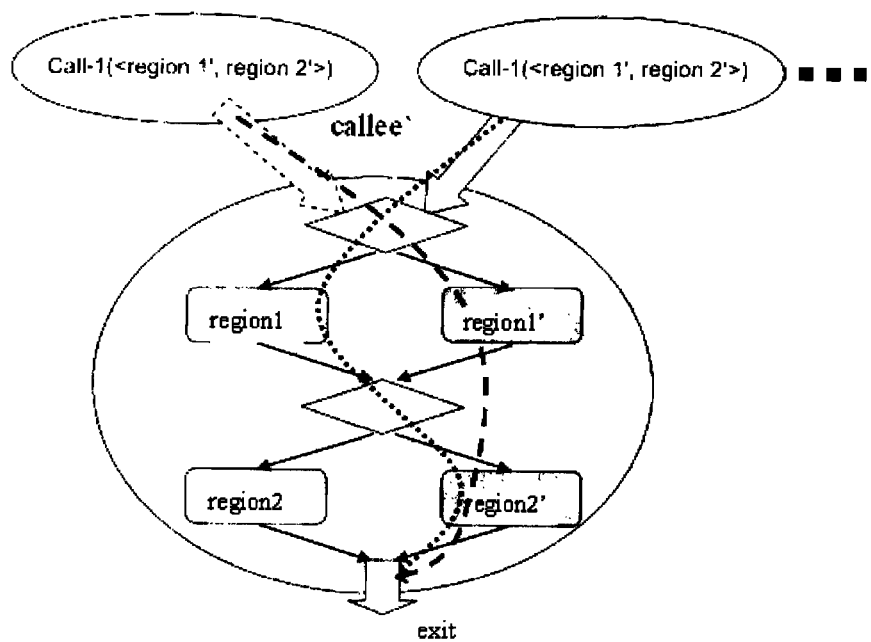
FIG. 12 is a block diagram showing the specialization of a callee, wherein both regions are specialized and the region that is to be executed at runtime is determined by the flag passed from the call site, in accordance with an illustrative embodiment.

FIG. 12 is a block diagram showing the specialization of a callee, wherein both regions are specialized and the region that is to be executed at runtime is determined by the flag passed from the call site, in accordance with an illustrative embodiment. FIG. 12 is a corresponding pictorial representation of the calling contexts, as shown in the pseudo code of FIG. 10. The flag from the call site provides some calling-context sensitive information. The compiler inserts code in the callee to decide which region to execute according to the flag.

Figure 13:
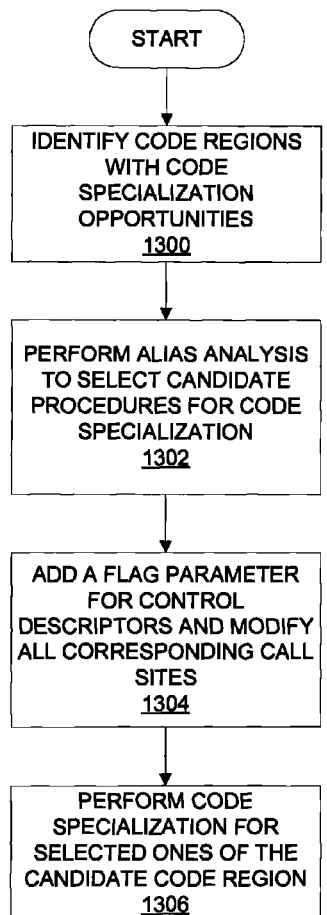
FIG. 13 is a flowchart showing a process of performing procedure control descriptor-based code specialization for context sensitive disambiguation, in accordance with an illustrative embodiment.

FIG. 13 is a flowchart showing a process of performing procedure control descriptor based code specialization for content sensitive disambiguation, in accordance with an illustrative embodiment. The process shown in FIG. 13 can be implemented in a data processing system, such as data processing system 100 shown in FIG. 1 or data processing system 200 shown in FIG. 2. The process shown in FIG. 13 can be implemented using a compiler, such as compiler 302 shown in FIG. 3. The process shown in FIG. 13 corresponds to the stages shown in FIG. 7.

The process begins as the compiler identifies code regions with code specialization opportunities (step 1300). The compiler then performs alias analysis to select candidate procedures for code specialization (step 1302). Candidate procedures can exist in one or more of the code regions. The compiler then adds a flag parameter for procedure control descriptors associated with corresponding candidate procedures and then modifies all corresponding call sites (step 1304). The complier then performs code specialization for selected ones of the candidate code regions (step 1306). Candidate code regions are those code regions having a candidate procedure or candidate procedures.

Figure 14:
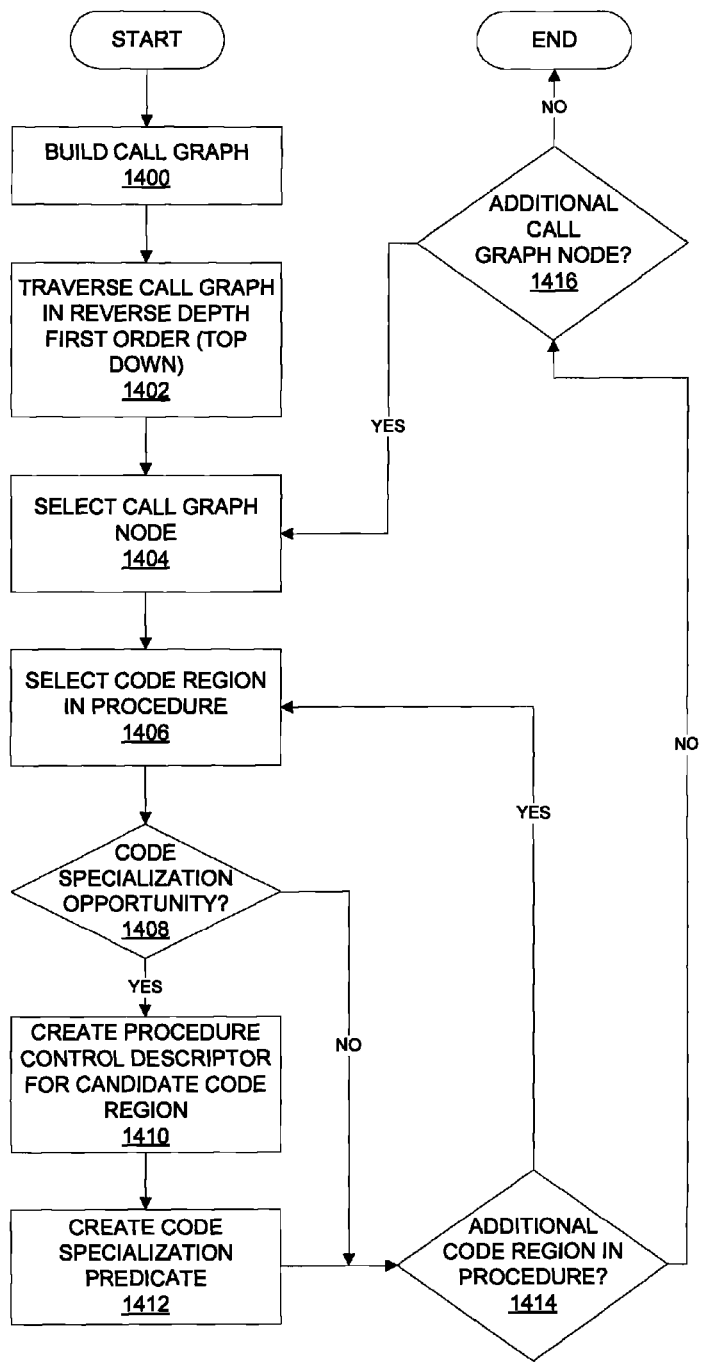
FIG. 14 is a flowchart showing a process for identifying code regions for code specialization opportunities, in accordance with an illustrative embodiment.

FIG. 14 is a flowchart showing a process for identifying code regions for code specialization opportunities, in accordance with an illustrative embodiment. The process shown in FIG. 14 can be implemented in a data processing system, such as data processing system 100 shown in FIG. 1 or data processing system 200 shown in FIG. 2. The process shown in FIG. 12 can be implemented using a compiler, such as compiler 302 shown in FIG. 3. The process shown in FIG. 14 also identifies the steps that can be taken to implement step 700 shown in FIG. 7.

The process begins as a compiler builds a call graph (step 1400). The call graph represents a calling relationship among subroutines in a computer program. The compiler then traverses the call graph in reverse step first order (top down) (step 1402). The compiler then selects a particular call graph mode (step 1404). The compiler then selects a candidate code region in a procedure (step 1406).

The compiler determines whether a code specialization opportunity exists for the selected code region (step 1408). If a code specialization opportunity does not exist then the process skips to step 1414. If the code specialization opportunity exists, then the compiler creates a procedure control descriptor for the candidate code region (step 1410). The compiler also creates code specialization predicates (step 1412). Code specialization predicates are conditions for which the corresponding code region can be specialized, if the conditions are true.

The compiler then determines whether additional code regions in the procedure are to be processed (step 1414). If additional code regions in the procedure are to be processed, then the process returns to step 1406 and repeats. Otherwise, the compiler determines whether additional call graph nodes are to be analyzed (step 1416). If additional call graph nodes are to be analyzed, then the process returns to step 1404 and repeats. If the compiler determines, at step 1416, that there are no additional call graph nodes to be analyzed, then the process terminates.

Figure 15:
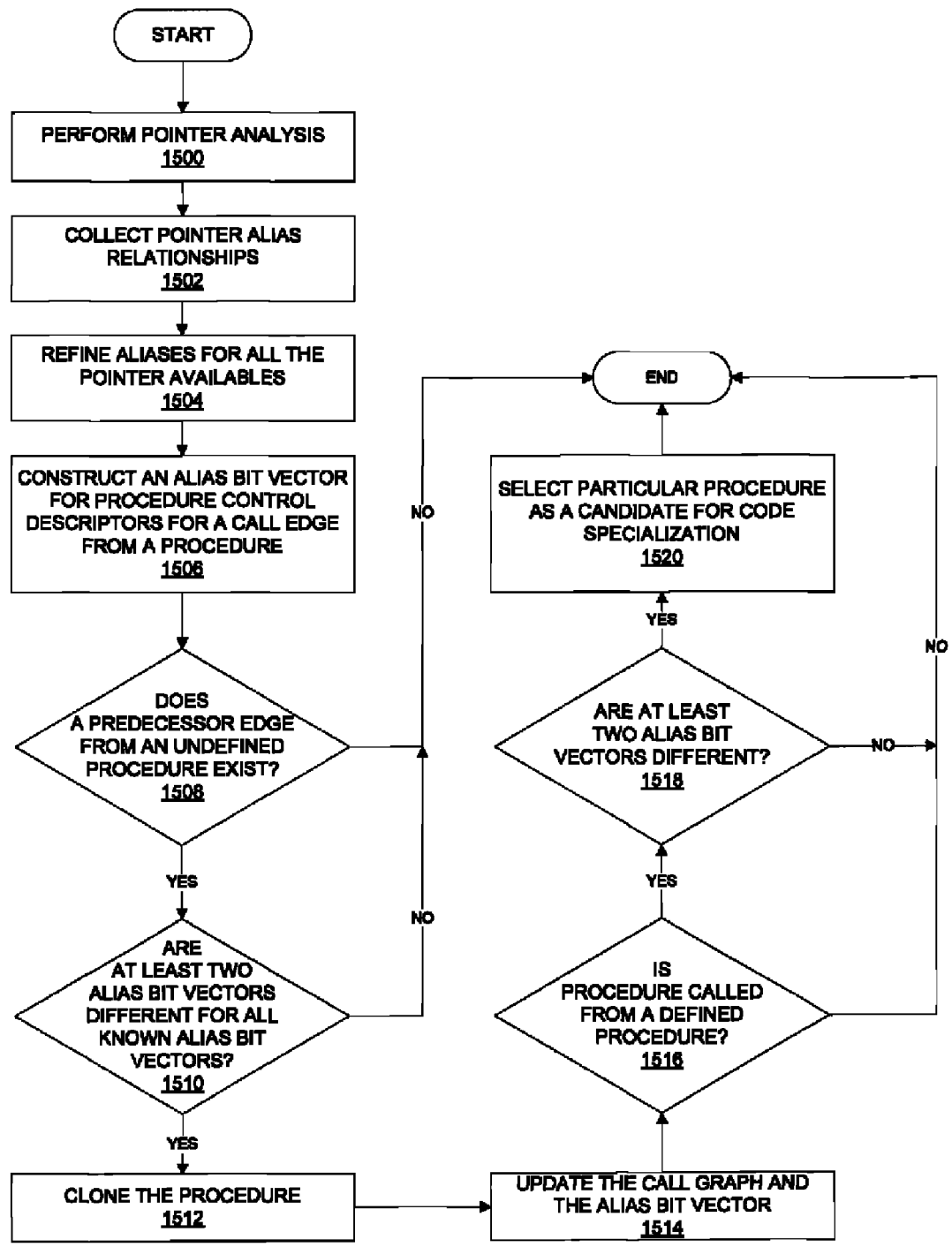
FIG. 15 is a flowchart illustrating a process for performing alias analysis to select candidate procedures for code specialization, in accordance with an illustrative embodiment.

FIG. 15 is a flowchart illustrating a process for performing alias analysis to select candidate procedures for code specialization, in accordance with an illustrative embodiment. The process shown in FIG. 15 can be implemented in a data processing system, such as data processing system 100 shown in FIG. 1 and data processing system 200 shown in FIG. 2. The process shown in FIG. 15 can be implemented in a compiler, such as compiler 302 shown in FIG. 3. The process shown in FIG. 15 shows an exemplary method for performing step 702 in FIG. 7.

The process begins as the compiler performs pointer analysis (step 1500). The compiler collects pointer alias relationships (step 1502). The compiler also refines aliases for all the pointer variables (step 1504). The compiler then constructs an alias bit vector for procedure control descriptors for a call edge from a defined procedure (step 1506). An alias bit vector for a procedure call describes the alias relationships for each call edge if the call edge is from a defined procedure.

The compiler then determines whether a predecessor edge from an undefined procedure exists (step 1508). If no such predecessor edge from an undefined procedure exists, then the process terminates. Otherwise, the compiler determines whether at least two alias bit vectors are different from all known alias bit vectors (step 1510). If this condition is not satisfied, then the process terminates. Otherwise, the compiler clones the procedure (step 1512). The compiler also updates the call graph and the alias bit vector (step 1514).

Note that when the callee is called by undefined procedures, no extra parameter can be added. However, when an opportunity exists for the calls from defined procedures, cloning is performed so that code versioning can be performed on the cloned procedure. Alternatively, versioning may be performed on the original procedure and the cloned procedure may remain unmodified; the effect is the same. Versioning allows a user to keep track of what version of code is currently being analyzed or modified.

The compiler then determines whether the procedure is called from a defined procedure (step 1516). If not, then the process terminates. If the procedure is called from the defined procedure, then the compiler determines whether at least two alias bit vectors are different (step 1518). If this condition is not satisfied, then the process terminates. Otherwise, the compiler selects the particular procedure as a candidate for code specialization (step 1520). The process terminates thereafter.

Figure 16:
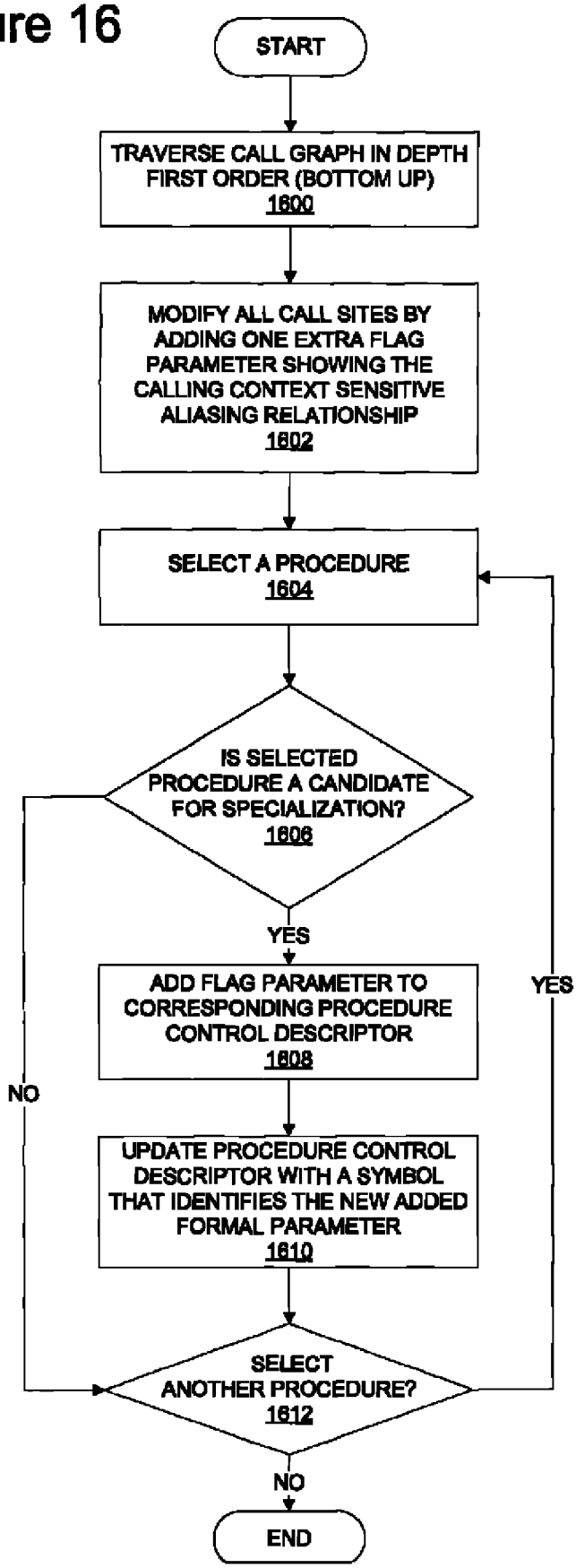
FIG. 16 is a flowchart illustrating a process for adding a fly parameter for procedure control descriptors and modifying corresponding call sites in a procedure, in accordance with an illustrative embodiment.

FIG. 16 is a flowchart illustrating a process for adding a flag parameter for procedure control descriptors and modifying corresponding call sites in a procedure, in accordance with an illustrative embodiment. The process show in FIG. 16 can be implemented in a data processing system, such as data processing system 100 shown in FIG. 1 and data processing system 200 shown in FIG. 2. The process shown in FIG. 16 can be implemented using a compiler, such as compiler 302 shown in FIG. 3. The process shown in FIG. 16 illustrates an exemplary method for performing step 704 in FIG. 7.

The process begins as the compiler traverses a call graph in depth first order (bottom up) (step 1600). The compiler modifies all call sites by adding one extra flag parameter showing the calling context sensitive aliasing relationship (step 1602). The compiler then selects a procedure for analysis (step 1604).

The compiler then determines whether the selected procedure is a candidate for code specialization (step 1606). If the selected procedure is not a candidate for specialization, then the process skips to step 1612 to determine whether to select the next procedure. Otherwise, the compiler adds a flag parameter to a corresponding procedure control descriptor of the candidate procedure (step 1608). The compiler then updates the procedure control descriptor with a symbol that identifies the new added formal parameter (step 1610). The compiler then determines whether to select another procedure (step 1612). If another procedure is to be selected, then the process returns to step 1604 and repeats. Otherwise, the process terminates.

Figure 17:
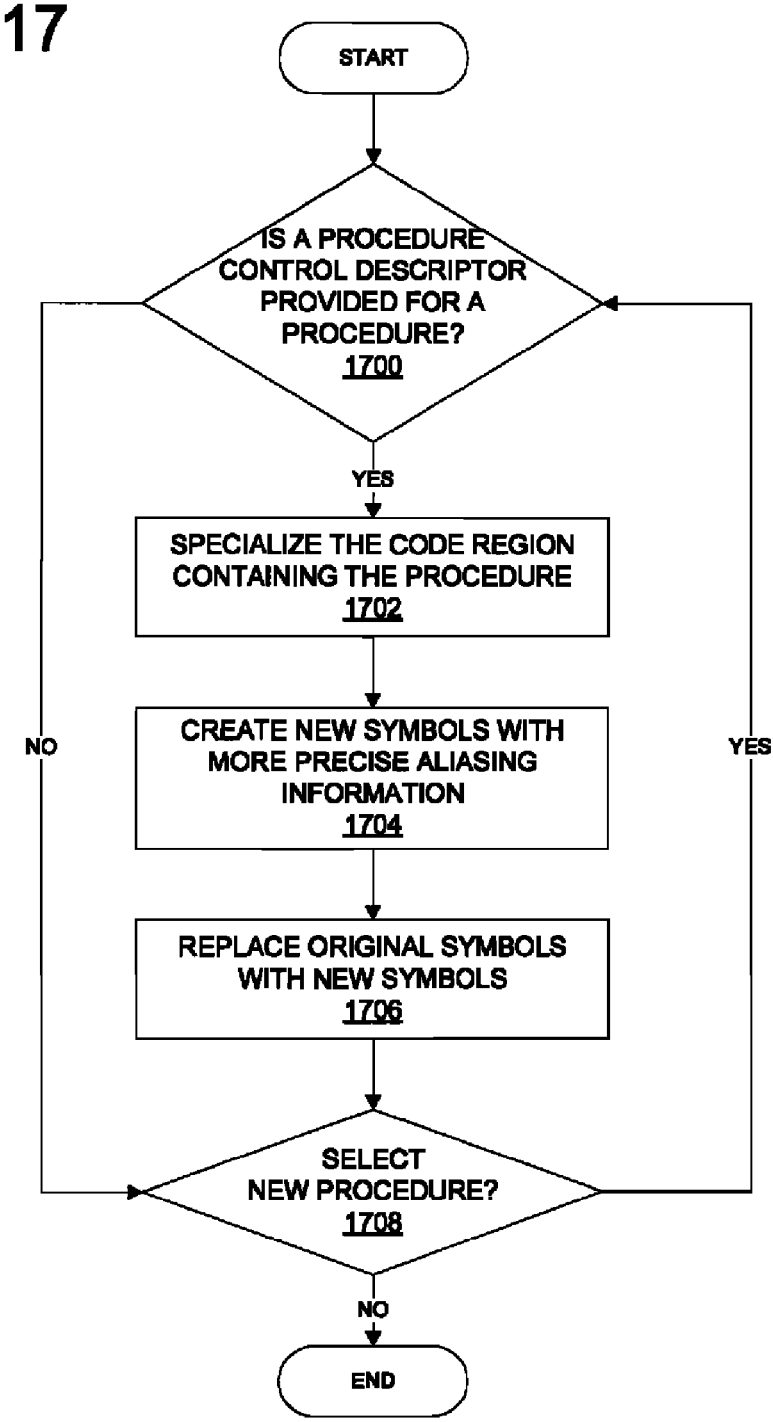
FIG. 17 is a flowchart illustrating a process for performing code specialization for candidate code regions, in accordance with an illustrative embodiment.

FIG. 17 is a flowchart illustrating a process for performing code specialization for candidate code regions, in accordance with an illustrative embodiment. The process shown in FIG. 17 can be implemented in a data processing system, such as data processing system 100 shown in FIG. 1 or data processing system 200 shown in FIG. 2. The process shown in FIG. 17 can be implemented using a compiler, such as compiler 302 shown in FIG. 3. In particular, the process shown in FIG. 17 is a method of performing step 706 shown in FIG. 7.

The process begins as the compiler determines whether a procedure control descriptor is provided for a procedure (step 1700). If no procedure control descriptor is provided for a procedure then the process proceeds to step 1708 to determine whether there is another procedure to consider. Otherwise, the compiler specializes the code region containing the procedure (step 1702). The compiler then creates new symbols with more precise aliasing information (step 1704), thereby indicating disjointed memory references. The compiler then replaces the original symbols with the new symbols (step 1706). The compiler then determines whether to select another procedure (step 1708). If a new procedure is to be selected, then the process returns to step 1700 and repeats. Otherwise, the process terminates.

FIG. 18 is a flowchart illustrating a method of procedure control descriptor-based code specialization for context sensitive memory disambiguation, in accordance with an illustrative embodiment. The process shown in FIG. 18 can be implemented in a data processing system, such as data processing system 100 shown in FIG. 1 or data processing system 200 shown in FIG. 2. The process shown in FIG. 18 can be implemented using a compiler, such as compiler 302 shown in FIG. 3. The process shown in FIG. 18 is an exemplary embodiment, which is similar to the embodiment shown in FIG. 7.

The process begins as the compiler scans the source code to identify a candidate region (step 1800). The compiler then generates a procedure control descriptor, wherein the procedure control descriptor corresponds to the candidate region, and wherein the procedure control descriptor identifies, for the candidate region, a condition which, if true at runtime means that the candidate region can be specialized (step 1802).

Responsive to a determination during compile time that satisfaction of the least one condition will be known only at runtime, the procedure control descriptor is used to specialize the candidate region at compile time to create a first version of the candidate region for execution in a case where the condition is true, and a second version of the candidate region for execution in a case where the condition is false, and further generating code to select one of the first region and the second region at runtime (step 1804).

In an illustrative embodiment, responsive to a determination during compile time that the condition will always be true at runtime, the compiler optimizes the candidate region at compile time according to satisfaction of the condition (step 1806). The process terminates thereafter.

FIG. 19 shows pseudo code for specializing a memory region, in accordance with an illustrative embodiment. The pseudo code shown in FIG. 19 is an example of pseudo code for performing code specialization on a candidate procedure. The pseudo code shown in FIG. 19 is used as described with respect to the example shown in FIG. 8.

Thus, the compilation methods of the illustrative embodiments allow code that contains some ambiguous memory allocations to be specialized with respect to unambiguous runtime values without requiring a full runtime memory ambiguity check. In an illustrative example, a general compiler method is shown for combining static analysis and runtime checking through procedure control descriptor-based code specialization for context sensitive memory disambiguation.

The illustrative examples described herein may reduce the amount of cloning required to handle different disambiguation scenarios for different call sites. Reduction in cloning may be achieved by passing the flag parameter with a mask for each candidate region.

Additionally, the illustrative embodiments described herein may reduce runtime costs from ambiguous memory commands by passing hints based on compile time analysis to the resulting executable code. These hints also enable other optimizing compilers to use context based assumptions to generate yet faster code. The hints take the form of procedure control descriptors associated with each procedure in a code region. Thus, the illustrative embodiments described herein provide for methods of compiling source code which may in appropriate circumstances result in executable code that operates faster then executable code compiled by formerly known techniques.

The invention can take the form of an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising:
    a computer storage medium having computer usable program code for specializing code, the computer program product including:
    computer usable program code for scanning the source code to identify a candidate region, wherein the source code of the candidate region includes memory allocation commands;
    computer usable program code for generating a procedure control descriptor, wherein the procedure control descriptor comprises a data structure containing a list of region procedure control descriptors containing context dependent information which corresponds to the candidate region, and wherein the procedure control descriptor identifies, for the candidate region, a condition which, if true at runtime means that the candidate region can be specialized; and
    computer usable program code, responsive to a determination during compile time that satisfaction of at least one condition will be known only at runtime, for using the procedure control descriptor to specialize the candidate region at compile time to create a first version of the candidate region for execution in a case where the condition is true and a second version of the candidate region for execution in a case where the condition is false, and further generating code to correctly select one of the first region and the second region at runtime.

2. The computer program product of claim 1 further comprising:
    computer usable program code for, responsive to a determination during compile time that the condition will always be true at runtime, optimizing the candidate region at compile time according to satisfaction of the condition.

3. The computer program product of claim 1, wherein the determination that the condition will be true at runtime is context sensitive.

4. The computer program product of claim 3, wherein when a procedure is called from a first call site the condition is true, and wherein when the procedure is called from a second call site the condition is not always true.

5. A computer program product comprising:
    a computer storage medium having computer usable program code for specializing code, the computer program product including:
    computer usable program code for performing alias analysis to identify at least one candidate code region having a code specialization opportunity, wherein a code specialization opportunity occurs when the at least one candidate code region can be disambiguated during compile time, wherein source code of the at least one candidate code region includes memory allocation commands;
    computer usable program code for selecting at least one procedure, wherein the at least one procedure contains the corresponding at least one candidate code region;
    computer usable program code for associating at least one procedure control descriptor with corresponding ones of the at least one procedure, wherein each corresponding procedure control descriptor comprises a data structure containing a list of region procedure control descriptors containing context dependent information and has a corresponding flag parameter of a corresponding flag, wherein the corresponding flag parameter identifies that the corresponding at least one procedure contains the corresponding at least one candidate code region; and
    computer usable program code for performing specialization, at compile time, of selected ones of the at least one candidate code region having the code specialization opportunity.

6. The computer program product of claim 5 wherein the computer usable program code for identifying further comprises:
    computer usable program code for building a corresponding call graph for each at least one procedure; and
    computer usable program code for traversing the call graph in reverse depth-first order.

7. The computer program product of claim 6 wherein the computer usable program code for identifying further comprises:
computer usable program code for, for each node of each corresponding call graph, examining a corresponding procedure to identify the code specialization opportunity.

8. The computer program product of claim 7 wherein the computer usable program code for identifying further comprises:
computer usable program code for creating at least one additional procedure control descriptor for at least one corresponding candidate code region for which at least one code specialization opportunity exists if a condition is true; and
computer usable program code for, for each at least one code specialization opportunity, creating a code specialization predicate for late evaluation.

9. The computer program product of claim 5 wherein the computer usable program code for performing alias analysis further comprises:
computer usable program code for performing procedural pointer analysis to create alias relationships; and
computer usable program code for refining aliases for all pointer variables.

10. The computer program product of claim 9 wherein the computer usable program code for performing alias analysis further comprises:
computer usable program code for constructing a corresponding alias bit vector to describe the alias relationships for corresponding ones of the at least one procedure control descriptor for each corresponding call edge from corresponding ones of the at least one procedure.

11. The computer program product of claim 10 wherein the computer usable program code for performing alias analysis further comprises:
computer usable program code for, for each at least one procedure, responsive to an existence of a corresponding predecessor edge from an undefined procedure and at least two alias bit vectors being different, cloning the corresponding undefined procedure, updating a corresponding call graph for each at least one procedure, and aliasing the corresponding alias bit vector.

12. The computer program product of claim 11 wherein the computer usable program code for performing alias analysis further comprises:
computer usable program code for, for each at least one procedure, responsive to the corresponding at least one procedure being a defined procedure and at least two alias bit vectors being different, selecting the corresponding procedure as the code specialization opportunity.

13. The computer program product of claim 5 wherein the computer usable program code for associating further comprises:
computer usable program code for traversing, in reverse depth first order, a corresponding call graph for each at least one procedure.

14. The computer program product of claim 13 wherein the computer usable program code for associating further comprises:
computer usable program code for modifying corresponding call sites with a corresponding value of a corresponding argument of the corresponding flag parameter.

15. The computer program product of claim 14 wherein the computer usable program code for associating further comprises:
computer usable program code for adding the corresponding flag parameters.

16. The computer program product of claim 15 wherein the computer usable program code for associating further comprises:
computer usable program code for updating each at least one procedure control descriptor with a corresponding symbol that identifies the corresponding flag.

17. The computer program product of claim 5 wherein the computer usable program code for performing code specialization further comprises:
computer usable program code for determining, for each at least one candidate code region, whether code specialization is needed, wherein the determination is made based on an availability of a corresponding procedure control descriptor for the corresponding at least one procedure.

18. The computer program product of claim 17 wherein the computer usable program code for performing code specialization further comprises:
computer usable program code for versioning the at least one code region using a corresponding symbol that corresponds with each at least one procedure control descriptor, wherein the corresponding symbol identifies the corresponding flag.

19. The computer program product of claim 18 wherein the computer usable program code for performing code specialization further comprises:
computer usable program code for creating second corresponding symbols, wherein the second corresponding symbols contain additional aliasing information; and
computer usable program code for replacing the corresponding symbols with the second corresponding symbols.

20. A computer program product comprising:
a computer storage medium having computer usable program code for specializing code, the computer program product including:
computer usable program code for gathering intra-procedural information during a forward pass compilation of the code;
computer usable program code for traversing a call graph of the code in reverse depth-first order;
computer usable program code for, for each procedure of code, creating a corresponding procedure control descriptor comprising a data structure containing a list of region procedure control descriptors containing context dependent information for the corresponding candidate procedure, wherein at least one candidate procedure contains therein at least one code region, and wherein source code of the at least one code region includes memory allocation commands;
computer usable program code for performing an intra-procedural alias analysis for all pointer variables referenced in the corresponding candidate procedure;
computer usable program code for collecting alias relationships for each at least one candidate procedure;
computer usable program code for analyzing the alias relationships for arguments of pointer types, wherein analyzing is performed at the end of the forward pass compilation when all nodes in the call graph have been traversed;
computer usable program code for refining corresponding aliases for all pointer variables for the code;
computer usable program code for computing the alias relationships for arguments of pointer type at all call sites for all procedures, wherein, for each procedure, all predecessor edges of a corresponding procedure node are traversed;

computer usable program code for constructing a corresponding bit vector to describe the alias relationships for each corresponding call edge of the call graph, if the corresponding call edge is from a defined procedure;

computer usable program code for examining sets of formal parameters in the corresponding procedure control descriptor;

computer usable program code for, for each set of formal parameters in the corresponding procedure control descriptor, computing the alias relationships for the arguments, and recording a corresponding bit value in the corresponding bit vector;

computer usable program code for, responsive to all the arguments in a given set being determined as not aliasing each other, recording a first bit value for the given set, otherwise, recording a second bit value in the given set;

computer usable program code for, responsive to the corresponding bit vectors for at least two of the predecessor edges from the defined procedures being different, and responsive to an existence of a predecessor edge from an undefined procedure, cloning each corresponding procedure to form a corresponding cloned procedure;

computer usable program code for replacing a corresponding call site by calling the corresponding cloned procedure, copying the corresponding procedure control descriptor from the corresponding cloned procedure, and updating the call graph by moving all call edges from the defined procedure as predecessors of the corresponding cloned procedure;

computer usable program code for, responsive to alias bit vectors for at least two predecessor edges from the defined procedure being different, and responsive to at least two predecessor edges of the corresponding procedure all being from defined procedures, selecting a corresponding procedure as a candidate procedure for interface change and code versioning;

computer usable program code for modifying the code during a backward pass by traversing the call graph in a depth-first order and, for each defined procedure, modifying all the call sites with new interfaces using a procedure interface descriptor;

computer usable program code for modifying a corresponding call interface for the at least one candidate procedure by, responsive to the at least one candidate procedure being a candidate for interface change and code versioning, creating a new formal parameter;

computer usable program code for creating an extra formal parameter for at least one candidate procedure, wherein a corresponding symbol identifying the new formal parameter is created;

computer usable program code for building a corresponding procedure interface descriptor for the at least one candidate procedure;

computer usable program code for recording an interface change in the corresponding procedure interface descriptor, wherein a corresponding entry in the corresponding procedure interface descriptor is added for the new formal parameter, wherein the corresponding entry contains the corresponding symbol and a type of the formal parameter;

computer usable program code for modifying the corresponding call interface with the new formal parameter;

computer usable program code for updating the corresponding procedure control descriptor with the corresponding symbol;

computer usable program code for, for each set of formal parameters in the corresponding procedure control descriptor, responsive to alias bit vectors for at least two predecessor edges from the defined procedure being different, updating an attribute field with the corresponding symbol of the new formal parameter;

computer usable program code for, for each set of formal parameters in the corresponding procedure control descriptor, responsive to all alias bit vectors of the defined procedure being the same, indicating uniform alias relationships for the set of the formal parameters and propagating the uniform alias relationships to the at least one candidate procedure;

computer usable program code for versioning the at least one code region using a corresponding procedure control descriptor condition based on the corresponding procedure control descriptor;

computer usable program code for creating, for each corresponding procedure control descriptor condition, at least one new corresponding symbol having more precise aliasing information; and computer usable program code for replacing the corresponding symbols with the at least one new corresponding symbol.

21. A computer implemented method for specializing code, the method comprising:

performing alias analysis to identify at least one candidate code region having a code specialization opportunity, wherein a code specialization opportunity occurs when the at least one candidate code region can be disambiguated during compile time and wherein source code of the at least one candidate code region includes memory allocation commands;

selecting at least one procedure, wherein the at least one procedure contains the corresponding at least one candidate code region;

associating at least one procedure control descriptor with corresponding ones of the at least one procedure, wherein each corresponding procedure control descriptor comprises a data structure containing a list of region procedure control descriptors containing context dependent information and has a corresponding flag parameter of a corresponding flag, wherein the corresponding flag parameter identifies that the corresponding at least one procedure contains the corresponding at least one candidate code region;

performing specialization, at compile time, of selected ones of the at least one candidate code region having the code specialization opportunity, wherein specialized code regions are formed; and storing at least the specialized code regions in a memory.

22. The computer implemented method of claim 21 wherein identifying further comprises:

building a corresponding call graph for each at least one procedure; and traversing the call graph in reverse depth-first order.

23. The computer implemented method of claim 21 wherein performing alias analysis further comprises:

performing procedural pointer analysis to create alias relationships; and refining aliases for all pointer variables.

24. The computer implemented method of claim 21 wherein associating further comprises:

traversing, in reverse depth first order, a corresponding call graph for each at least one code region.

25. The computer implemented method of claim 21 wherein performing code specialization further comprises:
   determining, for each at least one candidate code region, whether code specialization is needed, wherein the determination is made based on an availability of a corresponding procedure control descriptor for the corresponding at least one procedure.

26. A data processing system comprising:
   a bus;
   at least one processor coupled to the bus;
   one or more memory elements coupled to the bus, wherein at least one of the one or more memory elements contains a set of instructions for specializing code, wherein the at least one processor is adapted to carry out the set of instructions to:
   perform alias analysis to identify at least one candidate code region having a code specialization opportunity, wherein a code specialization opportunity occurs when the at least one candidate code region can be disambiguated during compile time and wherein source code of the at least one candidate code region including memory allocation commands;
   select at least one procedure, wherein the at least one procedure contains the corresponding at least one candidate code region;
   associate at least one procedure control descriptor with corresponding ones of the at least one code procedure, wherein each corresponding procedure control descriptor comprises a data structure containing a list of region procedure control descriptors containing context dependent information and has a corresponding flag parameter of a corresponding flag, wherein the corresponding flag parameter identifies that the at least one corresponding procedure contains the corresponding at least one candidate code region; and
   perform specialization, at compile time, of selected ones of the at least one candidate code regions having the code specialization opportunity.

27. The data processing system of claim 26 wherein the at least one processor is further adapted to carry out the set of instructions to identify by carrying out the set of instructions to:
   build a corresponding call graph for each at least one procedure; and
   traverse the call graph in reverse depth-first order.

28. The data processing system of claim 26 wherein the at least one processor is further adapted to carry out the set of instructions to perform alias analysis by carrying out the set of instructions to:
   perform procedural pointer analysis to create alias relationships; and
   refine aliases for all pointer variables.

29. The data processing system of claim 26 wherein the at least one processor is further adapted to carry out the set of instructions to associate by carrying out the set of instructions to:
   traverse, in reverse depth first order, a corresponding call graph for each at least one code region.

30. The data processing system of claim 26 wherein the at least one processor is further adapted to carry out the set of instructions to perform code specialization by carrying out the set of instructions to:
   determine, for each at least one candidate code region, whether code specialization is needed, wherein the determination is made based on an availability of a corresponding procedure control descriptor for the corresponding at least one procedure.

* * * * *